United States Patent
Gordley

(10) Patent No.: US 9,734,396 B2
(45) Date of Patent: Aug. 15, 2017

(54) METHOD OF REFRACTION ANGLE MAPPING OF EARTH'S LIMB

(71) Applicant: G&A Technical Software, Inc., Newport News, VA (US)

(72) Inventor: Larry L Gordley, Grafton, VA (US)

(73) Assignee: G&A TECHNICAL SOFTWARE, INC., Newport News, VA (US)

( * ) Notice: Subject to any disclaimer, the term of this patent is extended or adjusted under 35 U.S.C. 154(b) by 212 days.

(21) Appl. No.: 14/855,335

(22) Filed: Sep. 15, 2015

(65) Prior Publication Data

US 2017/0076137 A1   Mar. 16, 2017

(51) Int. Cl.
   *G01C 21/24*   (2006.01)
   *G06K 9/00*    (2006.01)
   *G06K 9/62*    (2006.01)

(52) U.S. Cl.
   CPC ........... *G06K 9/0063* (2013.01); *G01C 21/24* (2013.01); *G06K 9/6212* (2013.01)

(58) Field of Classification Search
   CPC . G06T 2207/10032; G06T 2207/30192; G06T 2207/30181; G01C 21/02; G01C 21/025; G01C 21/24; G01C 1/00; B64G 1/361; B64G 1/36; G06K 9/6202; G06K 9/0063; G06K 9/6212; G03B 15/006
   See application file for complete search history.

(56) References Cited

U.S. PATENT DOCUMENTS

| 7,265,820 B1* | 9/2007 | Gordley | G01C 11/06 356/3.01 |
| 8,767,072 B1* | 7/2014 | Rosenwinkel | G01C 21/025 348/148 |
| 2006/0282217 A1* | 12/2006 | Twitchell, Jr. | G01C 21/025 701/500 |
| 2012/0172061 A1* | 7/2012 | Dods | G01C 21/02 455/457 |

OTHER PUBLICATIONS

Liebe, Carl Christian. "Accuracy performance of star trackers—a tutorial." IEEE Transactions on aerospace and electronic systems 38, No. 2 (2002): 587-599.*

(Continued)

*Primary Examiner* — Sumati Lefkowitz
*Assistant Examiner* — Carol Wang
(74) *Attorney, Agent, or Firm* — Peter J. Van Berlen

(57) ABSTRACT

Refraction angles in a planet's atmosphere are mapped using a database of known star locations and a field imager onboard a platform above the planet. The field imager is positioned to observe a region that includes a portion of the planet's atmospheric limb. A star field image is captured for the region. The star field image includes stars within the field imager's field-of-view. Using the field imager and the database, a modeled star field image is generated that is matched in size to the field-of-view associated with the star field image. The modeled star field image defines absolute locations of stars corresponding to stars appearing in the field imager's field-of-view. Differences between the absolute locations and locations of the images of stars are indicative of a limb refraction angle field.

23 Claims, 4 Drawing Sheets

(56) References Cited

OTHER PUBLICATIONS

Stone, Ronald C. "An accurate method for computing atmospheric refraction." Publications of the Astronomical Society of the Pacific 108, No. 729 (1996): 1051.*
Gounley, Robert, Robert White, and Eliezer Gai. "Autonomous satellite navigation by stellar refraction." Journal of guidance, control, and dynamics 7, No. 2 (1984): 129-134.*
Larry Gordley et al., High precision refraction measurements by solar imaging during occultation: results form SOFIE, Applied Optics, Sep. 2009, pp. 4814-4825, vol. 48, No. 25.

* cited by examiner

METHOD OF REFRACTION ANGLE MAPPING OF EARTH'S LIMB

FIELD OF THE INVENTION

The invention relates generally to refraction angle profile generation, and more particularly to a method of generating a map of refraction angles in the Earth's limb using star field images.

BACKGROUND OF THE INVENTION

Currently, a variety of satellite sensors can make high altitude (i.e., above the tropopause) temperature and pressure measurements. For example, many remote optical sensors can provide moderate daily coverage using emission measurements. Unfortunately, remote optical sensing instruments are generally very expensive.

Temperature and pressure profiles can also be derived from Global Positioning System (GPS) measurements using orbiting receivers of signals from GPS transmitters. Though accurate, they require satellite receivers and often produce slanted profiles. GPS-based temperature and pressure profiles are limited by the directionality of GPS transmitters and the occultation between GPS and receiver platforms.

The most comprehensive global temperature data are generated using local measurements from the weather balloon network. Briefly, the weather balloon network includes nearly 1500 launch sites around the world. Most of the launch sites launch a weather balloon from land twice per day. Even with this seemingly large number of daily weather balloon launchings, the weather balloon network is limited in terms of temporal and spatial coverage, especially over oceans.

Atmospheric refraction angle profiles can also be used to generate temperature and pressure profiles. For example, see Gordley et al., "High Precision Refraction Measurements by Solar Imaging During Occultation: Results from SOFIE," App. Opt., Vol. 48, p. 4814-4825 (2009), for a description of how to convert refraction angle profiles to corresponding temperature and pressure profiles. Thus, an efficient and comprehensive approach to generating refraction angle profiles or mappings could prove very useful in the generation of atmospheric temperature and pressure profiles.

SUMMARY OF THE INVENTION

Accordingly, it is an object of the present invention to provide a method of mapping atmospheric refraction angles.

Another object of the present invention is to provide an efficient and comprehensive method of generating global refraction angle fields at high altitudes.

Other objects and advantages of the present invention will become more obvious hereinafter in the specification and drawings.

In accordance with the present invention, a method is provided for the mapping of refraction angles in a planet's atmosphere as a function of altitude above the planet. The method uses a database of known star locations and a field imager onboard a platform. The field imager is positioned to observe a region that includes a portion of the planet's atmospheric limb as viewed from the platform. A star field image is captured for the region using the field imager. The star field image includes images of stars appearing in the field imager's field-of-view. Using the field imager and the database, a modeled star field image is generated. Briefly, the modeled star field image is matched in size to the field imager's field-of-view, and is constructed from the database containing the absolute locations and intensities of those stars observed in the field imager's field-of-view. The modeled star field image is compared to the star field image. Differences between the absolute locations and locations of the images of stars are indicative of a limb refraction angle field for the field-of-view.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
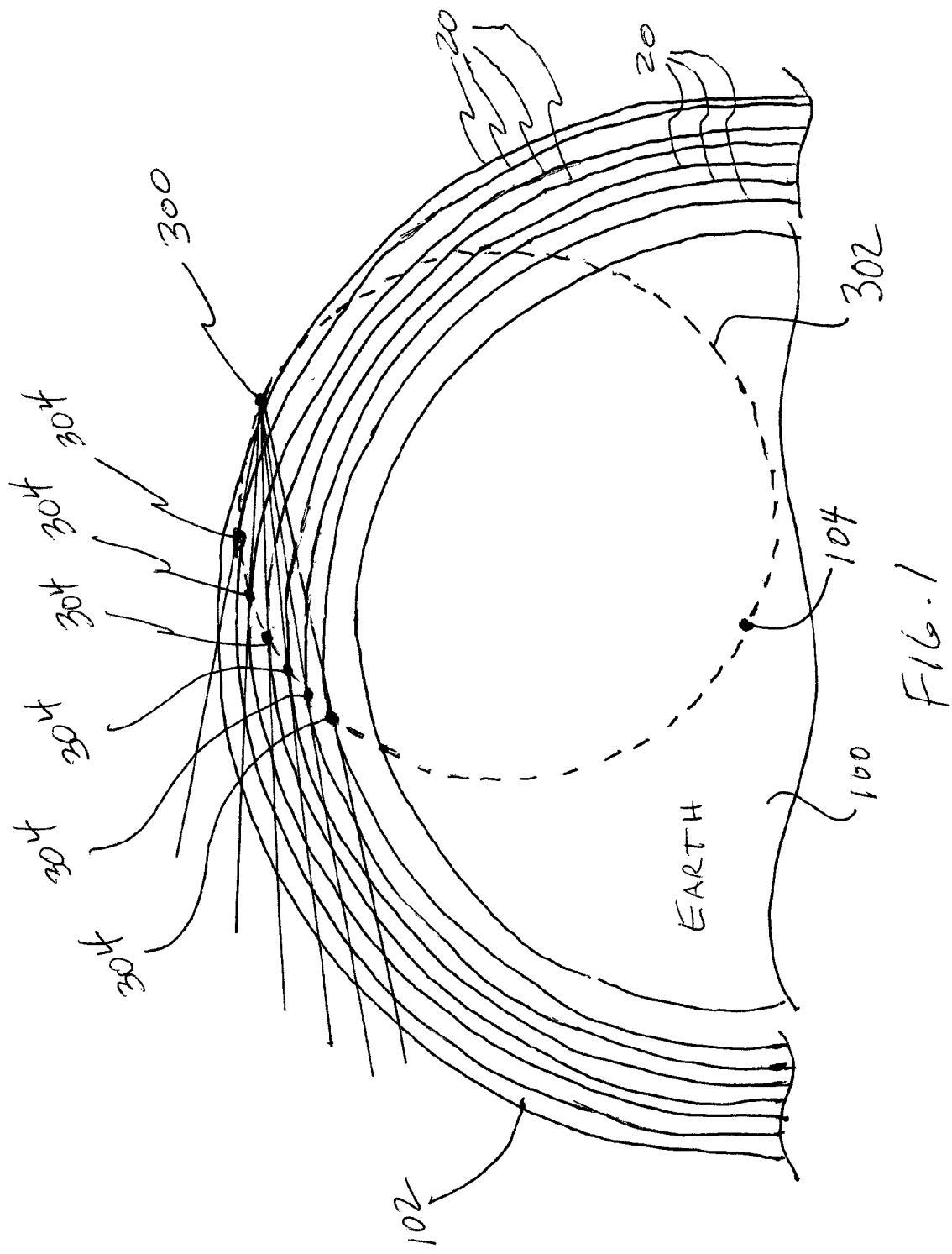
FIG. 1 is a schematic view of a portion of the Earth and a plurality of limb tangent altitudes as observed from a high-altitude platform.

Referring now to the drawings and more particularly to FIG. 1, a portion of the Earth is shown and is referenced generally by numeral 100. Surrounding or encasing Earth 100 is its atmosphere 102 that refracts light as the light passes through. The amount of refraction increases with density of the atmosphere. Accordingly, in general, light is refracted more near the surface of Earth 100 than at upper regions of the atmosphere. In regions beyond the atmospheric limb or space, light is not refracted.

Prior to explaining the method of the present invention, a few concepts will be explained. Continuing to refer to FIG. 1, various altitudes above Earth 100 are indicated by solid lines 200 encircling Earth 100 with an observation point being indicated by numeral 300 at an upper altitude. From observation point 300, a circle 302 can be defined whose diameter spans from observation point 300 to the center 102 of Earth 100. Lines extending from observation point 300 to tangent points 304 on circle 300 define measurement paths for the present invention as will be explained further below. Each tangent point 304 is at a different altitude above Earth 100. Accordingly, the refraction angles at tangent points 304 that are lower in altitude will be greater than refraction in angles at tangent points 304 that are lighter in altitude. Briefly, the present invention provides a method to determine the refraction angles at a number of tangent points 304 thereby defining a limb refraction angle field. The limb refraction angle field can be used to develop other useful atmospheric information. For example, the limb refraction angle field can be converted to a corresponding temperature field and/or pressure field in accordance with the teachings in the above-cited article by Gordley et al. It is further noted that the method of converting refraction angle profiles into temperature profiles is well known in the art of planetary sounding.

Figure 2:
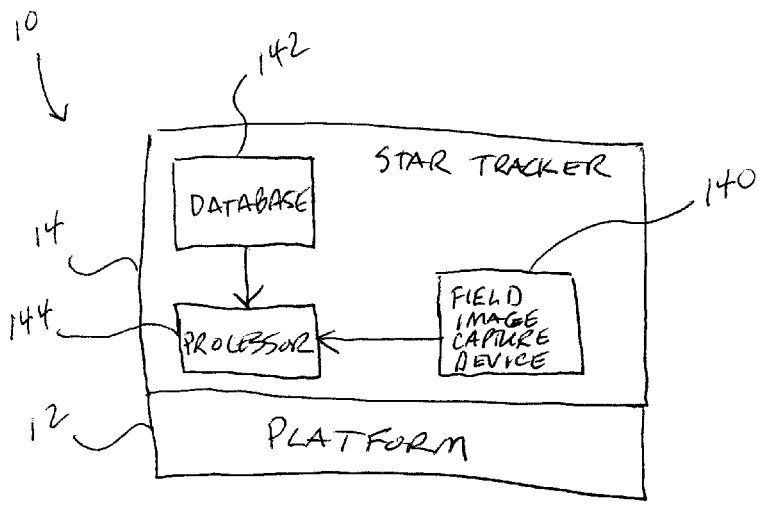
FIG. 2 is a schematic view of a platform equipped with a star tracker for refraction angle mapping in accordance with an embodiment of the present invention.

Referring now to FIG. 2, a schematic view is shown of a simple system 10 used to carry out refraction angle mapping in accordance with the present invention. System 10 includes a platform 12 located above the Earth (e.g., an unmanned aerial vehicle or UAV, a balloon such as the types used by weather balloon systems, high-altitude drones, etc.) and a star tracker 14. In general and as is known in the art, a star tracker is an optical device that measures the positions of stars. Star tracker 14 includes a field image capture device 140 (e.g., a camera, photo cells, etc.), and (or has access to) a database 142 and a processor 144. Database 142 stores a star catalog of known star locations. Typical star tracker catalogs store tens or hundreds of thousands of star locations.

Briefly, in use, field image capture device 140 captures an image of the heavens within the field-of-view of device 140. Processor 144 uses the captured image and the star catalog stored on database 142 to determine the location of the captured image. That is, processor 144 generates a model image using the stored star catalog and aligns the captured image with the model image where such alignment is indicative of the location of the star tracker.

Figure 3A:
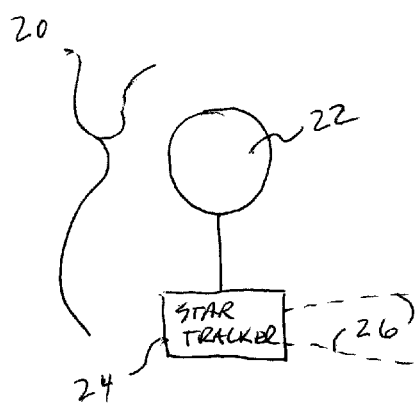
FIG. 3A is a schematic side view of a balloon equipped with a star tracker that captures images of stars and determines star locations for use in refraction angle mapping.
Figure 3B:
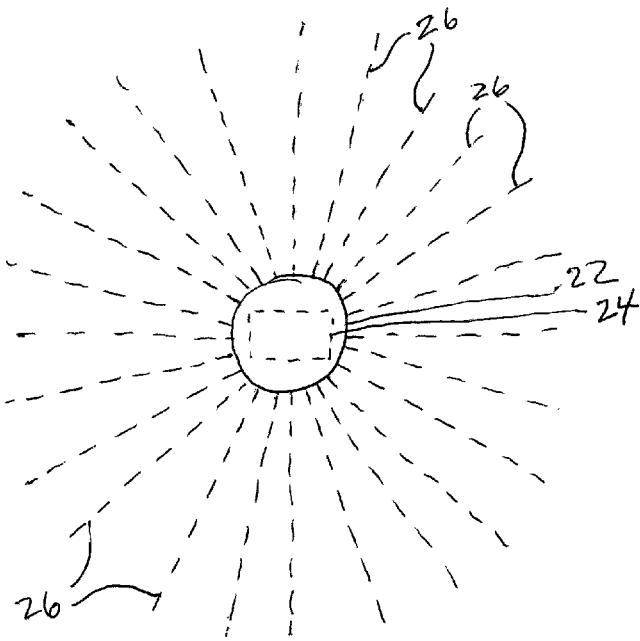
FIG. 3B is a top view of the balloon and star tracker illustrating a plurality of field-of-view image capture regions of the star tracker for a single measurement altitude.

The above-described process is well-known in the art of star tracker operation. The present invention uses the above-described features/capabilities of a star tracker to map refraction angles of the Earth's limb as viewed from the perspective of the star tracker. Referring now to FIGS. 3A and 3B, schematic side and top view, respectively, are shown for a system 20 that carries out measurements in accordance with the present invention. System 20 includes a balloon 22 and a star tracker 24. It is assumed that star tracker 24 has the same capabilities described above for star tracker 14. Accordingly, star tracker 24 can be operated to capture an image within its field-of-view defined between dashed lines 26. For example, field-of-view 26 can be a 15°×15° field-of-view. In such a case, it would take twenty-four incremental image captures to perform measurements in 360° of azimuth as illustrated in FIG. 3B. For example, all of system 20 or just star tracker 24 can be incrementally rotated through 360°. As will be explained further below, such incremental rotations of star tracker 24 can be performed at a single altitude (e.g., system 20 is flying or floating at a fixed or stable altitude), or at a number of altitudes as system 20 ascends or descends.

In accordance with the present invention, as balloon 22 flies (e.g., is released from a ground or in-air location and allowed to ascend or descend through the atmosphere), star tracker 24 is positioned to observe the atmospheric limb (as viewed by star tracker 24) and captures star field images lying within its field-of-view 26. For example and as mentioned above, star tracker 24 can capture star field images at a number of incremental azimuthal rotational positions at each of a plurality of altitudes as star tracker 24 ascends or descends with balloon 22. Each such star field image includes a portion of the atmospheric limb as viewed by the star tracker at its current altitude. Due to light refraction caused by the Earth's atmosphere in the limb, the image of the stars in any star field image (captured by star tracker 24) will be displaced relative to the corresponding stars' absolute locations. The amount of displacement or difference between an absolute location of a star and its location in the captured star field image is indicative of the refraction angle at that location. When these differences are determined for all stars and images of those stars in a star field image, a refraction angle map is generated for all star locations in the captured star field image. Accordingly, when this process is repeated for a number of incremental rotations of star tracker 24 at a number of altitudes, a limb refraction angle field can be generated.

Figure 4:
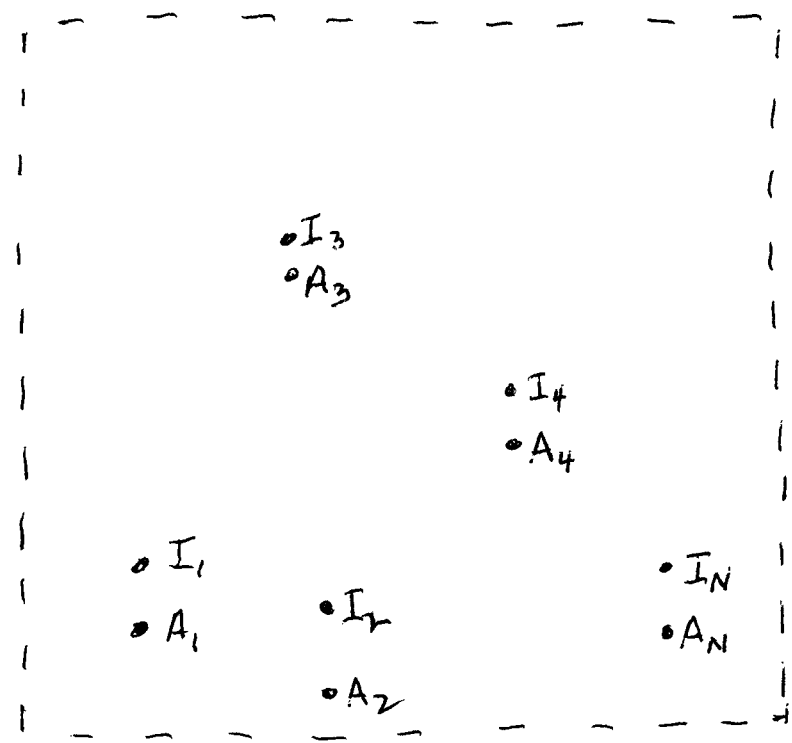
FIG. 4 is a schematic view of a star field image within the field-of-view of a star tracker overlaid with a modeled star field image matched to the star tracker's field-of-view in accordance with the present invention.

Referring now to FIG. 4, a schematic view of a star field image is overlaid with a modeled star field image. Assuming that the star tracker has a square field-of-view (e.g., a M°×M° field-of-view), a square star field image will be generated and will be overlaid with a same-size square region of absolute star locations. In FIG. 4, images of stars (1-N) captured by star tracker 24 are indicated by the letters "I" and the absolute locations of stars (1-N) in the modeled star field image are indicated by the letters "A". The spatial difference between each absolute star location $A_N$ and its corresponding image $I_N$ define a refraction angle at the location of image $I_N$.

The above-described simple example illustrates the basic concept employed by the present invention. However, different approaches can be used to infer refraction angle fields from the image. For example, the actual determination of the refraction field could involve distorting absolute star locations/intensities by iterating a two-dimensional ("2D") distortion function until the modeled star image "pattern" best matches the pattern in the star field image captured by the star tracker. There are a variety of ways of finding a suitable distortion function. Accordingly, it is to be understood that the method of determining the distortion function is not a limitation of the present invention. Applying this distortion approach yields a comparison of star field intensity patterns. In such a case, the "I" and "A" points illustrated in FIG. 4 are representative of star field intensity patterns.

To assure that the modeled star field image yielding absolute star locations (or distorted intensity patterns) $A_1$-$A_N$ is accurately matched to the corresponding field-of-view of the star tracker, it is necessary for each captured star field image to include a portion of the image that is not refracted or is negligibly refracted. For example, each captured star field image can include stars observed through limb altitudes that are sufficiently high so as not to appear to have refracted the stars' light (i.e., where light refraction is negligible). In this way, each star field image has a portion thereof where there is zero or nearly zero light refraction. That is, the images of the stars in the zero or nearly zero refraction portion of the star field image appear in their absolute or non-refracted location. By including areas of non-refracted stars (i.e., a non-distorted area of the image) in each captured star field image, the modeled image can be matched to an un-refracted area in the observed/measured image thereby allowing an accurate estimate of the 2D distortion function, which provides the 2D refraction field.

Figure 5:
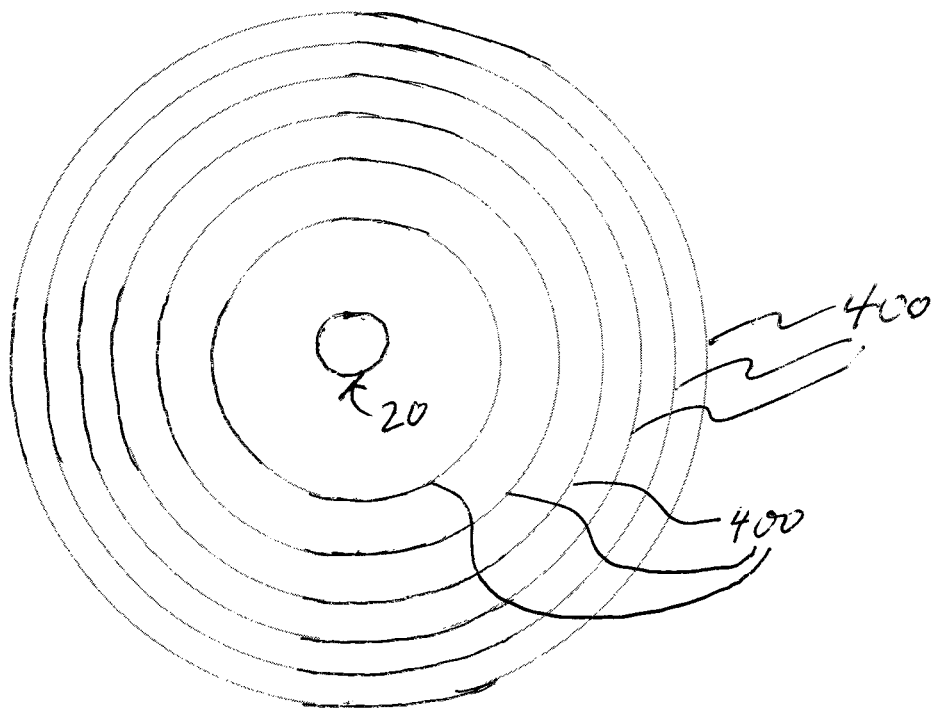
FIG. 5 is a top view of the balloon and star tracker illustrating a plurality of constant-altitude circles of a dome-shaped field of the Earth's limb whose refraction angles are mapped in accordance with the present invention.

FIG. 5 illustrates an exemplary measurement geometry of the present invention that generates a dome-shaped limb refraction angle field. During ascent or descent of system 20, the system's star tracker is operated at each of selected altitudes (indicated by the circles referenced by numeral 400) to generate refraction angle maps for 360° of incremental rotations of system 20 (or its star tracker). The diameters of circles 400 increase as the difference between the limb tangent altitude and the altitude of system 20 increase. That is, the larger diameter circles 400 define lower altitudes where a longer view of the limb is provided by the system's star tracker. The view length from sensor to observed limb altitude (or tangent height) decreases with increasing altitude thereby yielding a "dome" of measurements (or limb refraction angle field) as system 20 ascends or descends. If system 20 is mounted on a low earth orbiting satellite, a progression of images that observe setting or rising stars could be analyzed to provide temperature fields in the along-track direction of the satellite thereby allowing complete coverage with one instrument.

The advantages of the present invention are numerous. Large limb refraction angle fields can be measured using a high-altitude platform and a star tracker. For the described ascending or descending balloon and rotating star tracker, dome-shaped limb refraction angle fields can be readily generated. Using current state-of-the-art star trackers and balloons, layered dome-shaped fields spanning many kilometers in height and diameter can be generated. The refraction angle maps can be used to quickly and reliably generate important atmospheric information to include temperature field maps and/or pressure field maps. If included on high-altitude and/or satellite platforms, the present invention will greatly increase global atmospheric temperature and pressure measurements in the upper atmosphere (i.e., typically between cloud-top and about 35+ kilometers) thereby improving weather forecasting and providing dense temperature and pressure fields for many applications. As discussed above, the rings of temperature measurement could be swept around the globe in the direction of a satellite's ground track.

Although the invention has been described relative to a specific embodiment thereof, there are numerous variations and modifications that will be readily apparent to those skilled in the art in light of the above teachings. For example, the present invention could be implemented using star trackers whose priority function is to provide attitude information to the platform they service or is installed on. Refraction mapping in accordance with the present invention could thus be an additional product/function of such a system. Furthermore, it is to be understood that the above-described azimuthal rotation of a star tracker is not a requirements of the present invention. That is, the star tracker could also be employed for measurements of opportunity and/or measurements in certain directions for those applications interested only in refraction mapping (and a temperature profile) in a certain direction that augments the objective of the platform. It is therefore to be understood that, within the scope of the appended claims, the invention may be practiced other than as specifically described.

What is claimed as new and desired to be secured by Letters Patent of the United States is:

1. A method of mapping refraction angles in a planet's atmosphere as a function of altitude above the planet, comprising the steps of:
   providing a database of known star locations;
   providing a field imager onboard a platform above the planet, said field imager having a field-of-view;
   positioning said field imager to observe a region that includes a portion of the planet's atmospheric limb as viewed from the platform;
   capturing a star field image for said region using said field imager wherein said star field image includes images of stars appearing in said field-of-view;
   generating, using said field imager and said database, a modeled star field image sized to match said field-of-view wherein said modeled star field image defines absolute locations of stars corresponding to stars represented by said images of stars appearing in said field-of-view; and
   comparing said modeled star field image to said star field image wherein differences between said absolute locations and locations of said images of stars are indicative of a limb refraction angle field for said field-of-view.

2. A method according to claim 1, further comprising the step of rotating said field imager through 360°.

3. A method according to claim 2, wherein said step of rotating is performed in increments, said method further comprising the step of repeating said steps of positioning, capturing, generating, and comparing for each of said increments.

4. A method according to claim 1, wherein said platform is a balloon, and wherein said method further comprises the step of releasing said balloon for one of an ascent through the atmosphere, a descent through the atmosphere, and stable-altitude flotation in the atmosphere.

5. A method according to claim 4, further comprising the step of rotating said field imager through 360° after said step of releasing.

6. A method according to claim 5, wherein said step of rotating is performed in increments, said method further comprising the step of repeating said steps of positioning, capturing, generating, and comparing for each of said increments.

7. A method according to claim 1, further comprising the step of repeating said steps of positioning, capturing, generating, and comparing for a plurality of regions.

8. A method according to claim 1, wherein said region includes a portion of space above the planet's atmospheric limb.

9. A method according to claim 1, wherein said absolute locations are defined by an intensity pattern.

10. A method of mapping refraction angles in a planet's atmosphere as a function of altitude above the planet, comprising the steps of:
    providing a database of known star locations;
    providing a star tracker onboard a platform located above the planet, said star tracker having a field-of-view;
    positioning said star tracker to observe a limb region that includes a light-refracting environment and a non-light-refracting environment;
    capturing a star field image for said limb region using said star tracker wherein said star field image includes images of stars appearing in said field-of-view;
    generating, using said star tracker and said database, a modeled star field image sized to match said field-of-view wherein said modeled star field image defines absolute locations of stars corresponding to stars represented by said images of stars appearing in said field-of-view; and
    comparing said modeled star field image to said star field image wherein differences between said absolute locations and locations of said images of stars are indicative of a limb refraction angle field for said field-of-view.

11. A method according to claim 10, further comprising the step of rotating said star tracker through 360°.

12. A method according to claim 11, wherein said step of rotating is performed in increments, said method further comprising the step of repeating said steps of positioning, capturing, generating, and comparing for each of said increments.

13. A method according to claim 10, wherein said platform is a balloon, and wherein said method further comprises the step of releasing said balloon for one of an ascent through the atmosphere, a descent through the atmosphere, and stable-altitude flotation in the atmosphere.

14. A method according to claim 13, further comprising the step of rotating said star tracker through 360° after said step of releasing.

15. A method according to claim 12, wherein said step of rotating is performed in increments, said method further comprising the step of repeating said steps of positioning, capturing, generating, and comparing for each of said increments.

16. A method according to claim 10, further comprising the step of repeating said steps of positioning, capturing, generating, and comparing for a plurality of regions.

17. A method according to claim 10, wherein said non-refracting-light environment is a portion of space above the planet's atmospheric limb.

18. A method according to claim 10, wherein said absolute locations are defined by an intensity pattern.

19. A method of mapping refraction angles in a planet's atmosphere as a function of altitude above the planet, comprising the steps of:

providing a database of known star locations;

providing a star tracker onboard a balloon, said star tracker having a field-of-view;

releasing said balloon for one of an ascent through the atmosphere, a descent through the atmosphere, and stable-altitude flotation in the atmosphere;

positioning said star tracker to observe a portion of the planet's atmospheric limb;

capturing a star field image for said portion of the plant's atmospheric limb using said star tracker wherein said star field image includes images of stars appearing in said field-of-view;

generating, using said star tracker and said database, a modeled star field image sized to match said field-of-view wherein said modeled star field image defines absolute locations of stars corresponding to stars represented by said images of stars appearing in said field-of-view; and comparing said modeled star field image to said star field image wherein differences between said absolute locations and locations of said images of stars are indicative of a limb refraction angle field for said field-of-view.

20. A method according to claim 19, further comprising the step of rotating said star tracker through 360° after said step of releasing.

21. A method according to claim 20, wherein said step of rotating is performed in increments, said method further comprising the step of repeating said steps of positioning, capturing, generating, and comparing for each of said increments.

22. A method according to claim 21, wherein said steps of rotating and repeating are performed at a plurality of altitudes during said one of an ascent through the atmosphere, a descent through the atmosphere, and stable-altitude flotation in the atmosphere.

23. A method according to claim 19, wherein said absolute locations are defined by an intensity pattern.

* * * * *